United States Patent [19]
Haszeldine et al.

[11] 3,816,286
[45] June 11, 1974

[54] PROCESS FOR INSERTION OF HEXAFLUOROPROPENE AT THE ALIPHATIC CARBON-HYDROGEN BOND OF A HYDROCARBON OR SUBSTITUTED HYDROCARBON OR SUBSTITUTED HYDROCARBON

[76] Inventors: Robert Neville Haszeldine, Windyridge Lyme Rd., Disley; Ronald Rowland, 61 Bruche Ave. N., Padgate, both of England

[22] Filed: Jan. 5, 1973

[21] Appl. No.: 321,415

[30] Foreign Application Priority Data
Jan. 24, 1972   Great Britain ..................... 3328/72

[52] U.S. Cl. ......................... 204/163 R, 204/162 R
[51] Int. Cl. .............................................. B01j 1/10
[58] Field of Search ..................... 204/163 R, 162 R

[56] References Cited
UNITED STATES PATENTS
3,458,416   7/1969   Hardwick et al. ............... 204/163 R

*Primary Examiner*—Benjamin R. Padgett

[57] ABSTRACT

Process for the addition of hexafluoropropene in the presence of ultra violet light to a hydrocarbon or substituted hydrocarbon compound containing at least one aliphatic carbon-hydrogen bond and which is free of acetylenic and terminal ethylenic unsaturation.

3 Claims, No Drawings

PROCESS FOR INSERTION OF HEXAFLUOROPROPENE AT THE ALIPHATIC CARBON-HYDROGEN BOND OF A HYDROCARBON OR SUBSTITUTED HYDROCARBON OR SUBSTITUTED HYDROCARBON

This invention concerns a novel reaction for the preparation of fluorinated organic compounds and compositions. More particularly this invention concerns a novel reaction for the preparation of fluorinated organic compounds and compositions containing in the molecular structure one or more terminal and/or pendant

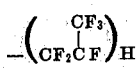

groups; the bracket in the formula

being used to indicate that the hydrogen atom may be attached either to the primary carbon atom, giving rise to a

group, or to the secondary carbon atom, giving rise to a

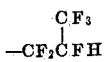

group.

A variety of methods have been proposed hitherto for the preparation of fluorinated organic compounds and compositions. The main practical method has been by the reaction of organic chlorine-containing compounds with various metallic fluorides thereby to replace the chlorine atom or atoms by fluorine. The particular drawback of this method is the cumbersome use of inorganic materials. The method is also limited in its applicability. Other methods have involved electrochemical fluorination and direction fluorination of organic compounds, for example, with hydrogen fluoride, fluorine, or certain inorganic fluorides. Again procedures are involved, yields are often poor, and decomposition products of the organic starting material often predominate.

Also known are various telomerisation reactions in which a telogen is reacted with a fluoroolefin to form telomers containing one or more repeating fluoroolefin units. Such reactions proceed by a free radical mechanism involving the initial scission of the telogen to form a free radical, followed by chain propagation and transfer and finally chain termination, to build up telomers of the type R(fluoroolefin)$_n$X, where RX is the formula of the telogen. Such processes are disadvantageous in that it is difficult to control the value of $n$ in the final product with any degree of precision, the product usually being a mixture of compounds having a range of values for $n$. Although X in the formula of the telogen is usually halogen, the telomerisation reaction has been extended to telogens where X is hydrogen; see, for example, U.S. Patent Specifications Nos. 2,411,158, 2,433,844, 2,540,088 and 2,559,628. Such telomerisation reactions usually require the presence of a free radical initiator, e.g. a peroxy compound or an azo compound, etc., which may be disadvantageous in that initiator fragments will appear as contaminants in the final product.

Yet another technique of introducing fluorine containing groups into a non-fluorinated base material, particularly polymeric materials, such as polyethylene, polyamides, etc. involves bombarding the base material, whilst in the presence of a fluoroolefin, with high energy particles, e.g. highly accelerated electrons or nuclear particles such as protons, neutrons, alpha particles, deuterons, beta particles, etc. Such techniques are disclosed, for example, in U.S. Patent Specification No. 3,065,157. The generation of such high energy particles, of course, requires highly sophisticated expensive equipment.

By contrast with the above techniques, we have found that a hexafluoropropene unit can be inserted into an aliphatic carbon-hydrogen bond, i.e., a bond between a hydrogen atom and a carbon atom which does not form part of an aromatic ring, in a highly controlled manner to give a 1:1 adduct, by a simple photochemical reaction which involves exposing the compound containing the aliphatic carbon-hydrogen bond to ultra violet light in the presence of hexafluoropropene but in the complete absence of an air or other free oxygen containing gas and in the complete absence of any chemical initiator, i.e., free radical forming chemical catalyst. By 1:1 adduct we mean the insertion of one and only one hexafluoropropene unit into one aliphatic carbon-hydrogen bond in the molecule, i.e.:

Where the starting compound has more than one aliphatic carbon-hydrogen bond, one molecule of the starting compound may react with two or more molecules of hexafluoropropene to yield a product having a plurality of pendant and/or terminal

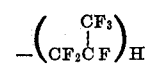

groups, although, except for macromolecular materials, products having only one inserted hexafluoropropene unit will generally predominate. The process of the invention is thus quite distinct from a telomerisation procedure giving rise to terminal groups of the formula

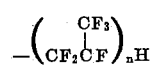

While we do not wish to be bound by any theory, the insertion reaction of the invention is believed not to proceed by a reaction mechanism involving initiation by free mono-radicals. Thus, the conditions do not exist for free radical chain propagation leading to adducts having a chain of repeating fluoroolefin units, as in a telomerisation procedure.

The insertion reaction according to the invention may be performed on any organic compound or composition containing in its molecular structure an aliphatic carbon-hydrogen bond and which is otherwise substantially free of groups or substituents unstable under the conditions of the reaction. In particular, compounds containing terminal ethylenic unsaturation, i.e. groups of the formula $CH_2=CH-$ and $CH_2=CMe-$ and compounds containing acetylenic unsaturation are to be avoided. The process of the present invention is particularly applicable to hydrocarbon starting materials containing in their molecular structure at least one aliphatic carbon-hydrogen bond and which are substantially free of acetylenic and terminal ethylenic unsaturation. The reaction is thus applicable to short and long chain alkanes, e.g. methane, ethane, the propanes, butanes, hexanes, octanes and higher paraffins ranging upwards into oils and hydrocarbon paraffin waxes; hydrocarbon polymers, including in particular, polyolefins such as polyethylenes, polypropylenes, ethylene-propylene copolymers, polystyrene; cycloalkanes, e.g. cyclopropane, cyclobutane, cyclopentane, cyclohexane, methylcyclopentane, methycyclohexane, decahydronaphthalene; arylalkanes or alkyl aromatics, such as ethylbenzene, amylbenzene, the xylenes, cymene, trimethylbenzenes; cycloalkenes, such as cyclopentene, cyclohexene, cycloheptene and cyclooctene; and nonterminal alkenes, such as trimethylethylene, hex-3-ene and but-2-ene.

The insertion reaction of the invention is also applicable to organic compounds containing functional groups inert under the conditions of the reaction. Such functional groups which may be present in the starting compounds include, for example, carboxyl, hydroxy, cyanide and ester, ether and thioether linkages, aldehyde, ketone, and sulfur and halogen (e.g. chlorine, fluorine and bromine) atoms.

Typical substituted hydrocarbons usable as starting materials in accordance with the present invention are carboxylic acids such as acetic acid, propionic acid, isobutyric acid, lauric acid, palmitic acid, stearic acid, toluic acid, phenylacetic acid, adipic acid, sebacic acid, malonic acid, carboxylic acid esters and polyesters with monohydric and polyhydric alcohols, aldehydes and ketones such as isobutyraldehyde, heptaldehyde, stearaldehyde, acetone, methyl ethyl ketone, acetophenone, and cyclohexanone; alcohols such as methanol, ethanol, butanol, amyl alcohol, hexanol, heptanol, octanol, cyclohexanol, butan-2-ol, 1-phenylethanol, or 2-phenylethanol; ethers such as dimethyl ether, diethyl ether, dibutyl ether, methyl amyl ether, methyl cyclohexyl ether, anisole, trioxan, dioxan, tetrahydropyran, tetrahydrofuran 1,2-dimethoxyethane, methylal, 1,3-dioxalan; alkyl sulfides such as dimethyl sulfide, dibutyl sulfide; halogenated and polyhalogenated compounds including chloroalkanes, fluoroalkanes, chlorofluoroalkanes, bromoalkanes and the like, such as methyl chloride, methylene chloride, chloroform, methyl fluoride, methylene fluoride, chlorodifluoromethane, methyl bromide, ethyl chloride, ethyl fluoride, ethyl bromide, 1,1-difluoroethane, 1,1,1-trifluoroethane, 1,1,1-trichloroethane, 2,2-dichloropropane, n-propyl chloride, n-propyl fluoride, n-hexyl chloride, n-hexyl fluoride, 1-chloro-1,1-difluoroethane, 1-phenyl-1-chloroethane; and cyanides such as methyl cyanide.

Also included as starting materials in accordance with the present invention and in addition to hydrocarbon polymers mentioned earlier are macromolecular materials such as polyesters, polycarbonates, polyamides, acrylate polymers and copolymers and haloolefin polymers and copolymers. For reasons which will hereinafter become apparent, such hydrocarbon and other macromolecular materials form an especially preferred group of starting materials in the insertion reaction of this invention.

Turning now to the products of the insertion reaction of the present invention, and leaving aside for the moment macromolecular starting materials, mono-inserted products will generally predominate. Depending on the reactant ratios and on the reaction conditions, however, di- and poly-inserted products can be obtained.

Generally, it is found that the reactivity of the aliphatic carbon-hydrogen bond in a hydrocarbon decreases in the series tertiary, secondary, primary. In hydrocarbon starting materials, therefore, insertion of the hexafluoropropene unit will occur at a tertiary carbon atom in preference to a secondary atom, and at a secondary atom in preference to a primary atom. Thus, in the photochemical reaction between n-butane and hexafluoropropene, the major product is $C_2H_5CH(CH_3)CF_2CFHCF_3$ (obtained by insertion into a bond between hydrogen and a secondary carbon atom).

In starting materials containing a functional group, the presence of the functional group will affect the reactivity of carbon-hydrogen bonds in the molecule, especially those in the immediate vicinity of the functional group or groups. Where a starting material is used which contains a functional group no hard and fast rules can be given governing the position at which the hexafluoropropene unit is inserted by the reaction of the present invention, except that, in general, the insertion will occur at the weakest carbon-hydrogen bond. The same is true of di-insertion products where the introduction of the first hexafluoropropene group into the molecule introduces a functional group which will influence the position of insertion of second and subsequent hexafluoropropene groups.

As has already been indicated, the hexafluoropropene unit can, in theory, be inserted into the C-H bond in either of two directions, giving rise either to a straight or branched chain structure in the terminal or pendant group. In practice, it is found that the insertion reaction of the invention usually leads to the formation of the straight chain grouping, i.e., a terminal or pendant

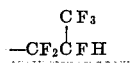

group. With certain starting materials, however, the isomeric grouping is also obtained.

The insertion reaction of the invention provides a route to a wide range of fluorinated organic compounds. Where a hydrocarbon reactant is used the product will consist of a hydrocarbon backbone carrying one or more pendant and/or terminal

groups. Such compounds have a variety of uses. The products are often liquids and oils with a low freezing point and of good chemical and thermal stability attributable to the presence of fluorocarbon unit or units. These liquids and oils make useful dielectric liquids, non-corrosive heat exchange media, solvents, lubricants, etc. The products also form a useful starting point for the preparation of other fluorinated organic compounds containing functional groups. In particular, the presence of the hydrogen atom in the terminal or pendant fluorocarbon group renders the group susceptible to dehydrofluorination to form a terminal or pendant perfluoroolefin group, e.g. a perfluoroallyl group: -CF$_2$CF:CF$_2$, a perfluoropropenyl group: -CF:CFCF$_3$, or a >C:CFCFHCF$_3$ group. Such unsaturated groupings open up a route to a wide range of derivatives. More especially, such unsaturated compounds constitute a valuable class of fluorocarbon olefins capable of a variety of chemical reactions, including, in the case of compounds containing the perfluoroallyl grouping, homo- or polymerisation with, for example, other fluoroolefins, such a vinyl or vinylidene fluoride or tetrafluoroethylene, to provide novel fluorocarbon polymers. The route to such unsaturated compounds is illustrated by the following reaction scheme:

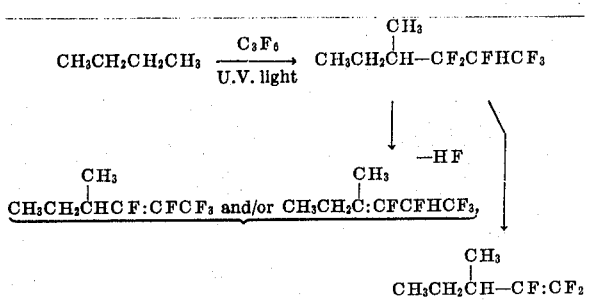

A particularly interesting development of the above procedure is in the double dehydrofluorination of the 1:1 adducts provided by the insertion reaction of the present invention to give fluorinated conjugated dienes useful in the preparation of fluorinated elastomers. Such a route is illustrated by the following reaction scheme:

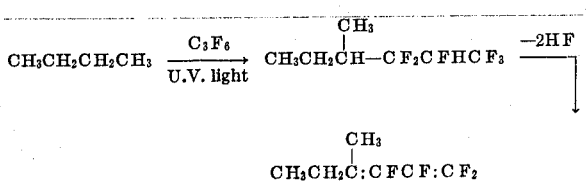

Also of interest are adducts of hexafluoropropene and aromatic compounds, e.g. of the formula RCH$_2$R' where at least one of R and R' is an aromatic group, the other, when not aromatic, being hydrogen or an aliphatic hydrocarbon radical free of acetylenic or terminal ethylenic unsaturation. With such starting compounds, the insertion reaction of the invention gives rise of 1:1 adducts of the formula RR'CHCF$_2$CFHCF$_3$ which provide a sueful starting point for the synthesis of biologically active compounds.

When using a starting material containing a functional group or groups the insertion reaction of the present invention provides a route to a wide range of substituted hydrocarbon compounds having as substituents both a functional group, e.g. carboxyl, hydroxyl, halogen, cyanide, or an ester or ether linkage, and a fluoroalkyl group. The products are often liquids and oils with a low freezing point and of good chemical and thermal stability attributable to the presence of the fluorocarbon unit or units. These liquids and oils make useful dielectric liquids, non-corrosive heat exchange media, solvents, lubricants, etc. Many of the products obtainable by the reaction of the present invention, e.g. those obtained from carboxylic acids exhibit useful surface active properties. The presence of the functional group renders the products obtained by the insertion reaction of the present invention particulary valuable starting materials for the synthesis of other useful derivatives. For example, the polyfluoroalkanols obtained by inserting a hexafluoropropene unit into an alkanol by the method of this invention may be esterified, for example, with acrylic acid, to give fluoroalkyl acrylates useful for conversion to products, e.g. polymers, useful for their surface active properties and capable of imparting water-proof, crease and stain resistant finishes to textiles. The polyfluoroalkanols may also be used to prepare polyfluoroolefins by a dehydration reaction, e.g.

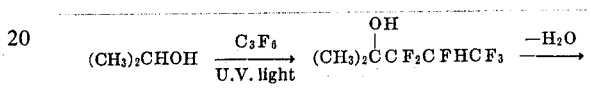

CH$_2$:CMeCF$_2$CFHCF$_3$, which are also useful as monomers and comonomers in the preparation of fluorinated polymers capable of imparting oil and water repellant finishes to textiles.

The fluorinated adducts obtained by the present invention can also be used as intermediates in the preparation of agricultural and pharmaceutical chemicals. Adducts obtained by inserting a hexafluoropropene group into an already fluorinated reactant, represent new compounds of potential value as aerosol propellents, refrigerants, anaesthetics and intermediates for the fluoropolymer industry.

As already indicated, the photochemical insertion reaction of the invention is carried out simply by exposing the reactants to ultra violet light in the absence of air or other free-oxygen-containing gas and in the absence of any chemical initiator. The reaction may be performed under an inert atmosphere or in a vessel from which all extraneous material is excluded, for example, by evacuation, followed by vacuum transfer of the reactants into the evacuated vessel. The reaction proceeds satisfactorily in the absence of solvents, but the presence of an inert solvent is often preferred. Most suitable as inert solvents are highly halogenated hydrocarbons.

Temperature and pressure are not critical. The reaction proceeds satisfactorily at room temperature, i.e., about 20°C, although moderately elevated temperatures, e.g. up to about 150°C, may be used. In many cases temperatures in the range of about 30°–100°C will be preferred.

The reaction may be carried out under atmospheric pressure. In most cases, however, superatmospheric pressures in the range of about 1–12 atmospheres will be preferred. Where the reactants are suitable, the reaction of the present invention can be carried out under continuous flow conditions.

Reactant ratios are not critical and are largely dependent upon the degree of insertion desired. A molar excess of hexafluoropropene will favor the formation of di- and poly-insertion products. A molar excess of organic C-H reactant will favor the formation of mono insertion products. For a high yield of the mono insertion products molar ratios (organic reactant: hexafluoropropene) in the range 2:1 to 4:1 are preferred.

Turning now to macromolecular reactants, an important application of the photochemical insertion reaction of this invention is in the modification of polymeric materials, in particular, of normally solid, high molecular weight polyolefins, such as polyethylene, polypropylene, polyisobutylene, polyamides, such as nylon, acrylic polymers, such as polymethyl methacrylate, polyesters, such as Terylene, polyhaloolefins and polycarbonates. The reaction of the invention may also be applied to the modification of naturally occurring macromolecular materials e.g. cellulosic materials such as cotton, paper, etc. The insertion of pendant

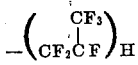

groups into the polymer molecules modifies many imporatnt properties of the polymer, e.g. melt flow properties, surface characteristics and moulding properties, without any appreciable cross-linking of the polymer molecules. This is in considerable contrast to the technique discussed hereinbefore of bombarding the polymer in the presence of the fluoroolefin with high energy particles, which technique, involving as it does, the formation of free radical sites, inevitably results in crosslinking of the polymer. In addition, the insertion reaction of the present invention may be used to enhance the chemical and thermal stability of the polymer.

The insertion reaction employing macromolecular starting material is carried out under substantially the same conditions of temperature and pressure discussed above for lower molecular weight compounds. The reaction of the invention may be used to give a surface treatment to polymers in the massive state: for example, the reaction may be used to modify the surface properties of polymer beads or moulded articles; a particular utility of the invention, however, resides in the treatment of polymeric material in the form of fibres or thin films. Such fibres and films are often temperature sensitive. Nevertheless, such films and fibres can be treated according to the invention at temperatures below that at which melting or other physical deformation takes place to provide fibres and films having substantially modified surface properties.

The amount of hexafluoropropene employed will depend on the degree of insertion desired and this in turn will depend on the modification desired in the final products. The insertion of as little as 1-12 percent by weight of hexafluoropropene units into the polymer is effective to provide significant changes in melt flow, surface properties and moulding characteristics. Substantially greater changes in the physical and chemical properties of the polymer may be brought about by the insertion of higher, e.g. up to 60 percent, of hexafluoropropene. The precise effects will differ from polymer to polymer. For example, the insertion of 14% by weight of hexafluoropropene into solid high molecular weight polyethylene converts the polymer into a highly fluorinated oil composition highly resistant to oxidative or other chemical degradation and useful as a heat transfer fluid or dielectric. The reaction of the present invention is particularly useful in imparting oil and water-repellent properties to paper and textile fabrics and also in imparting crease resistance and shrink resistance to fabrics such as wool and cotton.

The invention is illustrated by the following examples:

EXAMPLE I n-Propane (1.50g., 34.2 mmole) and hexafluoropropene (1.36 g., 11.4 mmole) were sealed in a 300 ml. silica ampoule and irradiated with ultra violet light from a Hanovia (Registered Trade Mark) S. 500 lamp placed at a distance of 15 cm. from the ampoule for 24 hours. Fractionation of the gaseous products gave hexafluoropropene (1.36 g., 9.1 mmole; 80 percent recovery); n-propane (1.13 g., 25.7 mmole; 75 percent recovery) and 1,1,1,2,3,3-hexafluoro-4-methylpentane (0.2 g., 1.03 mmole; 45 percent yield based on $C_3F_6$ consumed).

EXAMPLE II

Following the procedure of Example I, isobutane (1.98 g., 34.2 mmole) and hexafluoropropene (1.21 g., 11.4 mmole) were sealed in a silica ampoule and irradiated with ultra violet light for a period of 24 hours. Fractional separation of the products gave isobutane (1.74 g., 30.0 mmole, 88 percent recovery); hexafluoropropene (1.21 g., 8.1 mmole; 71 percent recovery) and 1,1,1,2,3,3-hexafluoro-4,4-dimethylpentane (0.36 g., 1.73 mmole; 52 percent yield based on $C_3F_6$ consumed).

EXAMPLE III

Following the procedure of Example I, cyclohexane (5.74 g., 68.4 mmole) and hexafluoropropene (3.42 g., 22.8 mmole) were sealed in a silica ampoule and irradiated, whilst being shaken mechanically, with ultra violet light for 24 hours. The gaseous and liquid products were separated. The gaseous product was shown to contain hexafluoropropene (1.58 g., 10.4 mmole; 46 percent recovery). Fractionation of the liquid products gave cyclohexane (4.70 g., 56 mmole; 82% recovery) and 1,1,2,3,3,3-hexafluoropropylcyclohexane (2.46 g., 10.5 mmole; 85 percent yield based on $C_3F_6$ consumed) b.p. 158°–159°C (Found: C, 46.3; H, 5.2; F, 48.6 percent M (mass spectrometry) 234. $C_9H_{12}F_6$ requires C, 46.2; H, 5.2; F, 48.6 percent; M 234.

EXAMPLE IV

Cyclopentane (4.79 g., 68.4 mmole) and hexafluoropropene (3.42 g., 22.8 mmole) were irradiated in a mechanically shaken silica ampoule with ultra violet light for 60 hours. The gaseous and liquid products were separated, the gaseous product containing hexafluoropropene (1.73 g., 11.5 mmole; 50 percent recovery). Fractionation of the liquid gave cyclopentane (4.13 g., 59.0 mmole; 86 percent recovery) and 1,1,2,3,3,3-hexafluoropropylcyclopentane (1.85g., 8.41 mmole; 74 percent yield based on $C_3F_6$ consumed) b.p. 132°C (Found: C, 43.9; H, 4.6; F, 51.5 percent; M (mass spectrometry), 220. $C_8H_{10}F_6$ requires C, 43.6; H, 4.6, F, 51.8 percent; M, 220).

EXAMPLE V

Tetrahydropyran (5.88 g., 68.4 mmole) and hexafluoropropene (3.42 g., 22.8 mmole) were irradiated in a mechanically shaken silica ampoule for 72 hours. Gaseous and liquid products were separated. The gaseous product contained hexafluoropropene (0.02 g., 0.1 mmole; 0.4 percent recovery). Fractionation of the liquid product gave tetrahydropyran (4.22 g., 49.1 mmole; 72. recovery) and α-(1,1,2,3,3,3-hexafluoropropyl) trihydropyran (4.36 g., 18.5 mmole; 82 percent yield based on $C_3F_6$ consumed) b.p. 164°–168°C. (Found: C,40.6; H, 4.5; F, 48.6 percent; M (mass spectrometry), 236. $C_8H_{10}F_6O$ requires: C, 40.7; H, 4.3; F, 48.3 percent; M 236. The α-(1,1,2,3,3,3-hexafluoropropyl) trihydropyran was resolved by preparative gas liquid chromatography into equimolar amounts of its two diastereoisomers.

EXAMPLE VI 1,4-Dioxan (6.02 g., 68.4 mmole) hexafluoropene (3.42 g., 22.8 mmole) were irradiated in a mechanically shaken silica ampoule with ultra violet light for 72 hours. Separation of the gaseous products gave hexafluoropropene (1.32 g., 8.8 mmole; 38 percent recovery). Fractionation of the liquid products gave 1,4-dioxane (4.70 g., 53.4 mmole; 78 percent recovery) and 2-(1,1,2,3,3,3-hexafluoropropyl) -1,4-dioxan (3.21 g., 13.5 mmole; 95 percent based on $C_3F_6$ consumed) b.p. 175°–177°C. (Found: C,35.3; H, 3.4; F, 48.0 percent; M (mass spectrometry), 238. $C_7H_8F_6O_2$ requires: C, 35.3; H, 3.4; F, 47.9; M 238). The product 2-(1,1,2,3,3,3-hexafluoropropyl)-1,4-dioxan was resolved by preparative gas liquid chromatography into equimolar amounts of its two diastereoisomers.

EXAMPLE VII

Butan-2-ol (5.06 g., 68.4 mmole) and hexafluoropropene (3.42 g., 22.8 mmole) were sealed in a silica ampoule and irradiated with ultra violet light and simultaneously shaken mechanically for 72 hours. Gaseous products were shown to contain methane (0.038 g., 2.4 mmole), carbon monoxide (0.084 g., 3.0 mmole) and hexafluoropropene (0.045 g., 0.3 mmole; 15 percent recovery). Fractionation of the liquid products gave butan-2-ol (3.09g., 41.7 mmole; 61 percent recovery) and 4,4,5,6,6,6-hexafluoro-3-methylhexan-3-ol (4.88 g., 21.8 mmole; 97 percent yield based on $C_3F_6$ consumed). b.p. 157°–158°C (Found: C, 37.8; H, 4.6 percent. $C_7H_{10}F_6O$ requires C, 37.5; H, 4.5 percent).

EXAMPLE VIII

Methyl fluoride (0.7 g., 20.7 mmole) and hexafluoropropene (1.54 g., 10.3 mmole) were sealed in a silica ampoule and irradiated with ultra violet light for 6 hours. The gaseous and liquid products were separated to give hexafluoropropene (0.75 g., 5.0 mmole; 49 percent recovery), methyl fluoride (0.62 g., 18.2 mmole; 88 percent recovery) and 1,2,2,3,4,4,4-heptafluorobutane (0.04 g., 2.5 mmole; 5 percent yield based on $C_3F_6$ consumed).

EXAMPLE IX

Chlorodifluoromethane (2.96 g., 34.2 mmole) and hexafluoropropene (1.71 g., 11.4 mmole) were sealed in a silica ampoule and irradiated with ultra violet light for 9 days. Separation of the products gave hexafluoropropene (0.95 g., 6.3 mmole; 55 percent recovery), chlorodifluoromethane (2.08 g., 24.0 mmole; 70 percent recovery) and 1-chloro-1,1,2,2,3,4,4,4-octafluorobutane (0.046 g., 0.2 mmole; 4 percent yield based on $C_3F_6$ consumed).

EXAMPLE X

Ethyl fluoride (1.65 g., 34.4 mmole) and hexafluoropropene (1,73 g., 11.4 mole) were sealed in a silica ampoule and irradiated with ultra violet light for 44 hours. Separation of the products gave hexafluoropropene (1.36 g., 9.05 mmole; 80 percent recovery), ethyl fluoride (1,56 g., 32.5 mmole; 95 percent recovery) and 1,1,1,2,3,3,4-heptafluoropentane (0.1 g., 0.5 mmole; 22 percent yield based on $C_3F_6$ consumed).

EXAMPLE XI

Samples of polyethylene film 2 inches × 5 inches were placed in silica ampoules. The ampoules were then evacuated and charged with hexafluoropropene to various pressures. Care was taken to exclude air and moisture during charging. The ampoules were then sealed and irradiated with ultra violet light from a 500 W Hanovia lamp for periods of from 7 to 72 hours. As a first control experiment a film sample was sealed in an evacuated silica ampoule without any hexafluoropropene and was kept in the dark for 72 hours without irradiation. As a second control, another film sample was sealed in an evacuated silica ampoule without any hexafluoropropene but was then irradiated for 72 hours.

Irradiation was carried out at room temperature, i.e., no special effort was made to heat or cool the ampoules during irradiation. The proximity of the UV lamp, however, caused the temperature in the ampoules to rise to 40°–60° during the course of the irradiation.

At the end of the experiment the samples were analysed for fluorine content and the surface properties investigated by measurement of the contact angle of ethyl benzoate on the surface and measurement of the angle of repose on untreated polyethylene film and on rubber. The values were compared with those obtained with an untreated polyethylene sample and with the control samples.

The results are shown in Table I.

TABLE I

| Sample | $C_3F_6$ pressure atmos. | Period of irradiation hrs. | Analysis %F | Contact Angle Side A | Contact Angle Side B | Angle of Repose Polyethylene | Angle of Repose Rubber |
|---|---|---|---|---|---|---|---|
| Original film | NIL | NIL | NIL | 16° | 16° | 23° | 38° |
| Control 2 | NIL | 72 | NIL | 22° | 15° | 22° | 40° |
| 1 | 8 | 72 | 4.2 | 53° | 38° | 30° | 56° |
| 2 | 8 | 7 | 2.0 | 55° | 42° | 25° | 53° |
| 3 | 1 | 72 | 1.8 | 50° | 35° | 23° | 60° |
| 4 | 1 | 20 | circa 1 | 56° | 55° | 23° | 52° |

The infra red spectra of the treated films shows significant C-F absorption at 7.8, 8.45 and 9.1$\mu$, and changes in the cystallinity of the polymer films were suggested by alterations in the relative intensities of absorption at 13.75 and 13.95$\mu$. Mass spectrographic investigation showed that adsorption of fluorocarbon was not the cause of the observed changes in the properties of the film.

The change in surface properties of the polyethylene film is shown by the increased angles of contact of ethyl benzoate and the increase angle of repose on untreated polyethylene and rubber. The increase of the angle of repose on rubber, representing a substantial increase in the surface friction is particularly marked.

Investigation of the properties of the polymer film from the first control experiment showed that the properties of the original film were unchanged. The second control experiment showed that there are no significant changes either when the film is irradiated in the absence of hexafluoropropene. Sample films irradiated in Pyrex ampoules instead of in silica ampoules, but otherwise under the conditions specified above, showed no significant changes in properties when compared with the original film, indicating that removal of radiation of wavelengths less than 3,000 Angstroms by the Pyrex prevents the insertion reaction of the present invention from taking place.

EXAMPLE XII

The experiment of Example XI was repeated except that the silica ampoules were mounted in a silica jacket through which a cooling or heating medium was passed in order to obtain accurate temperature control in the silica ampoule. The results are shown in Table II.

The infra red spectra of the treated film show bands at 7.85 and 8.45 $\mu$ which are associated with C-F absorption.

TABLE II

| Sample | $C_3F_6$ Pressure atmos. | Period of irradiation hours | Temp. °C | Analysis % F | Contact Angle Side A | Contact Angle Side B | Angle of Repose Polyethylene | Angle of Repose Rubber |
|---|---|---|---|---|---|---|---|---|
| 1 | 6 | 6 | 20 | 0.8 | 34 | 30 | 27 | 41 |
| 2 | 6 | 6 | 55 | 0.8 | 50 | 40 | 28 | 60 |
| 3 | 6 | 6 | 85 | 1.2 | 53 | 45 | 27 | 56 |
| 4 | 6 | 6 | 100 | 1.8 | 55 | 48 | 26 | 50 |

The above results show that the photochemical insertion of hexafluoropropene into polyethylene is enhanced by moderately elevated temperatures.

EXAMPLE XIII

Following the procedure of Example XI, the effect of the insertion reaction of the present invention on high density polyethylene film was investigated. The results are shown in Table III. The irradiation was performed at room temperature. A marked increase in the coefficient of friction of the treated films is apparent.

TABLE III

| Sample | $C_3F_6$ Pressure atmos. | Period of irradiation hours | Analysis % F | Angle of Repose H. D. Polyethylene | Angle of Repose Rubber |
|---|---|---|---|---|---|
| Original film | NIL | NIL | NIL | 28° | 30° |
| 1 | 8 | 72 | 1.4–2.9 | 62° | 60° |

EXAMPLE XVI

By the procedures of Example XI, the effect of the insertion reaction of the present invention on polypropylene film was investigated. The results are shown in Table IV.

TABLE IV

| Sample | $C_3F_6$ Pressure atmos. | Period of irradiation hours | Temp °C | Analysis % F | Contact Angle Side A | Contact Angle Side B | Angle of Repose Polyethylene | Angle of Repose Rubber |
|---|---|---|---|---|---|---|---|---|
| Original film | NIL | NIL | RT* | NIL | 10° | 10° | 22° | 53° |
| Control | NIL | 72 | RT* | NIL | 9° | 9° | 25° | 53° |
| 1 | 8 | 72 | RT* | 0.4 | 23° | 20° | 24° | 50° |
| 2 | 8 | 72 | 85 | 1.3 | 53° | 42° | 23° | 57° |

*room temperature

EXAMPLE XV

Polyethylene terephthalate film ("Melinex") samples were irradiated with ultra violet light in the presence of hexafluoropropene by the procedures of Example XI. The results are shown in Table V.

TABLE V

| Sample | $C_3F_6$ Pressure atmos. | Period of irradiation hours | Analysis °C | Angle % F | Angle of Repose Side A | Angle of Repose Side B | Temp Contact Polyethylene | Temp Contact Rubber |
|---|---|---|---|---|---|---|---|---|
| Original film | NIL | NIL | RT | NIL | 20° | 20° | 30° | 70° |
| Control | NIL | 72 | RT | NIL | 33° | 32° | 30° | 48° |
| 1 | 8 | 72 | RT | 0.2 | 45° | 25° | 28° | 68° |
| 2 | 8 | 72 | 85 | 1.0 | 42° | 38° | 25° | 48° |

EXAMPLE XVI

Sample films of Nylon 6 were irradiated with ultra violet light whilst in contact with hexafluoropropene by the procedure of Example XI. The results are shown in Table VI.

TABLE VI

| Sample | C₃F₆ Pressure atmos. | Period of irradiation hours | Analysis °C | Angle % F | Angle of Repose Side A | Angle of Repose Side B | Temp Contact Polyethylene | Temp Contact Rubber |
|---|---|---|---|---|---|---|---|---|
| Original film | NIL | NIL | RT | NIL | 22° | 22° | 23° | 35° |
| Control | NIL | 72 | RT | NIL | (a) | (a) | 28° | 38° |
| 1 | 8 | 72 | RT | 0.9 | 25° | 15° | 35° | 45° |

(a) The treated film was too crinkled to obtain any measurements.

Strong infra red absorption centered on 8.8μ was noted in the infra red spectra of the treated film. The treated films showed an increase in fraction.

EXAMPLE XVII

Sample films of unplasticized P.V.C. were irradiated with ultra violet light whilst in the presence of hexafluoropropene by the procedure of Example XI. The results are shown in Table VII

TABLE VII

| Sample | C₃F₆ Pressure atmos. | Period of irradiation hours | Analysis °C | Angle % F | Angle of Repose Side A | Angle of Repose Side B | Temp. Contact Polyethylene | Temp. Contact Rubber |
|---|---|---|---|---|---|---|---|---|
| Original film | NIL | NIL | RT | NIL | 32 | (a) | 27° | 40° |
| Control | NIL | 72 | RT | NIL | 31 | (a) | 32° | 42° |
| 1 | 8 | 72 | RT | 0.2 | 30 | (a) | 70° | 47° |

(a) No measurement was possible on the reverse side because of a very rapid spread

EXAMPLE XVIII

Sample films of polystyrene were irradiated with ultra violet light whilst in contact with hexafluoropropene by the procedure of Example XI. The results are shown in Table VIII. Irradiation was carried out at room temperature.

TABLE VIII

| Sample | C₃F₆ Pressure atmos. | Period of irradiation hours | Analysis % F |
|---|---|---|---|
| Original film | NIL | NIL | NIL |
| Control | NIL | 72 | NIL |
| 1 | 8 | 72 | 0.6 |

EXAMPLE XIX

Sample pieces of cotton Twill 423 were irradiated with ultra violet light in the presence of hexafluoropropene at 8 atmospherer pressure for 72 hours by the procedure of Example XI.

Irradiation was carried out over 72 hours at room temperature.

Analysis of the fabric sample at the end of the irradiation showed a fluorine content of 2 percent. The angles of repose of the treated samples on an untreated piece of cotton twill and on rubber were 85° and 60° respectively compared with 78° and 55° respectively for samples of the original untreated twill.

The treated samples were found to be markedly water resistant and would float on water; they showed no shrinkage on washing.

EXAMPLE XX

Samples of cotton Dacron 1035 were irradiated in the presence of hexafluoropropene under the conditions specified in Example XIX. Analysis showed a fluorine content of 0.2 percent in the irradiated fabric. The angle of repose of the treated samples on untreated Dacron 1035 and rubber were 78° and 52° respectively compared with 69° and 47° for untreated cotton Dacron.

The treated samples were waterproof.

EXAMPLE XXI

Leather samples (Crust Cowhide Garment Leather) irradiated with ultra violet light in the presence of hexafluoropropene under the conditions specified in Example XIX showed angles of repose on untreated leather and rubber of 39° and 50° compared with 37° and 48° respectively for untreated control samples. The treated samples took on a rubbery feel. Analysis showed a fluorine content of 1.7 percent.

EXAMPLE XXII

Samples of Kraft paper were irradiated with ultra violet light in the presence of hexafluoropropene (1 atmosphere) for 72 hours at room temperature.

The angles of repose of treated samples on untreated Kraft paper and rubber were 42° and 55° respectively, compared with 37° and 52° for untreated control samples.

The treated samples were waterproof and showed an increase in tensile strength. The breaking weight was 2.44 kg. as against 2.36 kg. for untreated control samples. The fluorine content of the treated samples was 1.1 percent.

EXAMPLE XXIII n-Butyl alcohol (26.0 g., 351 mmole) and hexafluoropropene (17.6 g., 117 mmole), sealed in vacuo in a 300 ml. silica ampoule, shaken and irradiated with ultra violet light from a 500-watt Hanovia lamp for 5 days gave (i) hexafluoropropene (9.36 g., 62.4 mmole; 53 percent recovery) and a liquid product which was fractionated at atmospheric pressure to give (ii) n-butyl alcohol (18.7 g., 246 mmole; 70 percent recovery), and (iii) 1,1,1,2,3,3-hexafluoro-4-hydroxyheptane. (ca., 12 g., 53.5 mmole; 98 percent yield based on hesafluoropropene consumed), (Found: C, 37.7; H, 4.8 percent, M (mass spec.), 224. $C_7H_{10}F_6O$ requires: C, 37.5; H, 4.5 percent; M, 224) b.p. 57.5°/18 mm. This compound has been prepared by Lazerte and Koshar, J. Amer. Chem. Soc. 1955, 77, 910 by a peroxide-initiated telomerisation reaction. The $^{19}F$ nmr of 1,1,1,2,3,3-hexafluoro-4 -hydroxyheptane indicated the present of two diastereoisomers.

EXAMPLES XXIV n-Heptyl alcohol (20.3 g., 175.5 mmole) and hexafluoropropene (8.8 g., 58.5 mmole), sealed in vacuo in a 300-ml. silica ampoule, shaken and irradiated with ultra violet light from a 500 watt Hanovia lamp for seven days gave, from distillation of the products from two such tubes, hexafluoropropene (10.05 g., 67 mmole; 57 percent recovery), n-heptanol (34.3 g., 296 mmole; 84 percent recovery), and 1,1,1,2,3,3-hexafluoro-4-hydroxydecane. (ca. 12.2 g., 46 mmole; 92 percent yield base on hexafluoropropene consumed), b.p 48°/0.6 mm. The $^{19}F$ nmr spectrum of 1,1,-1,2,3,3-hexafluoro-4-hydroxydecane indicated the presence of a pair of diastereoisomers.

EXAMPLE XV n-Octyl alcohol (22.2 g., 171 mmole) and hexafluoropropene (8.55 g., 57 mmole), shaken and irradiated for seven days in silica gave hexafluoropropene (2.2 g., 14,8 mmole; 26 percent recovery), n-octyl alcohol (16.3 g., 125.4 mmole; 73 percent recovery), and 1,1,-1,2,3,3-hexafluoro-4-hydroxyundecane (9.8 g., 35 mmole; 83 percent yield based on hexafluoropropene consumed), b.p. 93°–95°/3 mm. The $^{19}F$ nmr spectrum of 1,1,1,2,3,3-hexafluoro-4-hydroxyundecane indicated the presence of a pair of diastereioisomers.

EXAMPLE XXVI

Hexafluoropropene (21.4 g., 14.25 mmole) and tetrahydrofuran (2.64 g., 36.67 mmole), sealed in vacuo in a silica tube (ca. 10 ml) and irradiated with ultra violet light for 100 hours gave tetrahydrofuran (1.55 g. 21.53 mmole), and α-(1,1,1,2,3,3-hexafluoropropyl)-trihydrofuran (2.90 g., 13.06 mmole; 92 percent yield based on hexafluoropropene consumed (Found: C, 38.8; H, 4.0. $C_7H_8F_6O$ requires C, 37.8; H, 3.6 percent, b.p. 137–8°.

EXAMPLE XXVII

Hexafluoropropene (2.44 g., 16.27 mmole) and dimethylether (1.92 g., 41.74 mmole) sealed in vacuo in a silica tube (ca 10 ml), and irradiated with ultra violet light for 95 hours gave dimethylether (0.86 g., 18.69 mmole; 45 percent recovery) and 2,2,3,4,4,4-hexafluorobutyl methyl ether (2.08 g., 10,61 mmole; 65 percent yield based on $C_3F_6$ consumed) (Found: C, 31.6; H, 3.1 percent; M, 194. $C_5H_6F_6O$ requires C, 30.6; H, 3.1 percent; M, 196), b.p. 87°/758 mm.

We claim:

1. A process for inserting hexafluoropropene into the structure of a hydrocarbon compound or substituted hydrocarbon compound containing at least one aliphatic carbon-hydrogen bond and which is free of acetylenic and terminal ethylenic unsaturation, said insertion of hexafluoropropene being at said carbon-hydrogen bond, which comprises contacting at a temperature within the range of about 20°C. to about 150°C. said hydrocarbon compound with hexafluoropropene monomer while exposed to ultra violet light radiation, in the absence of free oxygen-containing gases and free-radical catalyst.

2. A process according to claim 1 wherein the temperature is in the range of about 30°C to 100°C.

3. A process according to claim 1 wherein the molar ratio of hexafluoropropene to the hydrocarbon reactant is in the range of 2:1 to 4:1.

* * * * *